United States Patent [19]

Lee

[11] 4,098,734

[45] Jul. 4, 1978

[54] POLYMERIC ALLOY COMPOSITION

[75] Inventor: Yoon C. Lee, Springfield, Mass.

[73] Assignee: Monsanto Company, St. Louis, Mo.

[21] Appl. No.: 778,802

[22] Filed: Mar. 17, 1977

[51] Int. Cl.² .................................................. C08L 1/10
[52] U.S. Cl. ........................... 260/17 R; 260/29.6 NR;
260/29.6 RB; 260/23 EM; 260/37 N;
260/42.47; 260/857 UN; 260/873; 260/876 R;
260/880 R; 260/881; 260/884; 260/885
[58] Field of Search .................. 260/17 R, 881, 42.47,
260/37 N

[56] References Cited

U.S. PATENT DOCUMENTS

| 3,780,134 | 12/1973 | Lonning | 260/876 |
| 3,901,839 | 8/1975 | Lonning | 260/876 |
| 3,930,073 | 12/1975 | Drelich et al. | 260/17 R |

*Primary Examiner*—Harold D. Anderson
*Assistant Examiner*—Regenia F. Hughes
*Attorney, Agent, or Firm*—Joseph S. Nelson; William J. Farrington; James C. Logomasini

[57] ABSTRACT

The present invention relates to a fusible polymeric alloy composition comprising (A) a matrix interpolymer, (B) a grafted diene rubber, (C) a polymer other than (A) or (B) having a solubility parameter in the range of 8.5 to 13 and (D) an inorganic filler. Said alloy having low thermal expansion, high modulus and toughness yet unexpectedly superior processing and molding properties for highly filled alloys.

10 Claims, No Drawings

POLYMERIC ALLOY COMPOSITION

BACKGROUND OF THE INVENTION

Inorganic fillers when blended with polymers to increase the modulus of the plastics for higher engineering performance have always adversely affected toughness and processability, in particular moldability giving blemishes, streaks and other surface defects because of their incompatibility.

It has now been found, unexpectedly, that polymers differing from the basic matrix polymer, but having a solubility parameter of from about 8.5 to 13 and having some measure of compatibility with the matrix polymer can form alloys with the matrix polymer that can tolerate heavy loadings of inorganic filler. The alloys have good molding properties along with higher tensile modulus, improved heat distortion and a substantial decrease in thermal expansion providing high performance engineering polymeric alloys.

SUMMARY OF THE INVENTION

The present invention relates to a fusible polymeric alloy composition comprising a blend of:
A. a matrix interpolymer comprising monovinylidene aromatic and ethylenically unsaturated nitrile monomers,
B. a grafted rubber copolymer having a diene rubber as a substrate grafted with said monomers as superstrate interpolymers,
C. a polymer other than (A) or (B) having a solubility parameter in the range of from 8.5 to 13, and
D. an inorganic filler.

EMBODIMENTS OF THE PRESENT INVENTION

The interpolymer

The interpolymers of the present invention of both the matrix and the graft superstrates consist at least principally of a monovinylidene aromatic hydrocarbon and an unsaturated nitrile, i.e., such monomers comprise at least 50.0% by weight and preferably at least 75.0% by weight of the interpolymers. Most desirably, such monomers comprise at least 90.0% by weight of the interpolymer and the usual commercial compositions are substantially completely comprised of such monomers although minor amounts, i.e., less than 5.0% by weight of other components such as chain transfer agents, modifiers, etc., may be included.

As will be readily appreciated, the interpolymers used for the graft superstrates should be compatible with the interpolymer of the matrix so as to obtain good properties which will require the presence of the similar monomers. Most desirably, the superstrate interpolymers closely approximate the chemical composition of the interpolymer of the matrix so as to obtain matching of the chemical properties, and, accordingly, it is desirable that the superstrates of both graft copolymers closely approximate each other. In addition, it is believed that increased chemical bonding is thereby obtained with commensurate improvement in chemical properties. Moreover, by close matching of certain interpolymers used in the matrix and superstrate such as those containing acrylate, it is possible to obtain a high degree of translucency and substantial transparency. However, it will be appreciated that deviations in the composition of the interpolymers of the matrix and superstrates such as different monomers and/or ratios may be desirable for some applications and that some deviations may inherently occur as the result of process variables.

Exemplary of the monovinylidene aromatic hydrocarbons which may be used in the interpolymers are styrene; alpha-alkyl monovinylidene monoaromatic compounds, e.g. alpha-methylstyrene, alpha-ethylstyrene, alpha-methylvinyltoluene, alpha-methyl dialkylstyrenes, etc.; ring-substituted alkyl styrenes, e.g., vinyl toluene, o-ethylstyrene, p-ethylstyrene, 2,4-dimethylstyrene, etc.; ring-substituted halostyrenes, e.g. o-chlorostyrene, p-chlorostyrene, o-bromostyrene, 2,4-dichlorostyrene, etc.; ring-alkyl, ring-halosubstituted styrenes, e.g. 2-chloro-4-methylstyrene, 2,6-dichloro-4-methylstyrene, etc.; vinyl naphthalene; vinyl anthracene, etc. The alkyl substituents generally have 1 to 4 carbon atoms and may include isopropyl and isobutyl groups. If so desired, mixtures of such monovinylidene aromatic monomers may be employed.

Exemplary of the unsaturated nitriles which may be used in the interpolymers are acrylonitrile, methacrylonitrile, ethacrylonitrile and mixtures thereof.

Exemplary of the monomers which may be interpolymerized with the monovinylidene aromatic hydrocarbons and unsaturated nitriles are conjugated 1,3 dienes, e.g., butadiene, isoprene, etc.; alpha- or beta-unsaturated mono-basic acids and derivatives thereof, e.g. acrylic acid, methyl acrylate, ethyl acrylate, butyl acrylate, 2-ethylhexyl acrylate, methacrylic acid and the corresponding esters thereof, acrylamide, methacrylamide; vinyl halides such as vinyl chloride, vinyl bromide, etc.; vinlidene chloride, vinylidene bromide, etc.; vinyl esters such as vinyl acetate, vinyl propionate, etc.; dialkyl maleates or fumarates such as dimethyl maleate, diethyl maleate, dibutyl maleate, the corresponding fumarates, etc. As is known in the art, the amount of these comonomers which may be included in the interpolymer will vary as the result of various factors.

In addition, the monomer formulation at the time of polymerization may include a preformed polymer or a partially polymerized material such as a partially polymerized monovinylidene aromatic hydrocarbon or interpolymer thereof.

The polymerizable monomer mixtures contain at least 20% by weight of the monovinylidene aromatic monomer and preferably at least 50% by weight thereof. They also contain at least 5% by weight of the unsaturated nitrile and preferably at least 10% by weight thereof. From the standpoint of highly advantageous commercial practice, the monomer formulations contain 20 to 95% and preferably 60 to 85%, by weight of the vinylidene aromatic hydrocarbon and 80 to 5% and preferably 40 to 15%, by weight of the unsaturated nitrile.

The matrix

As is well known in the art, the polyblend is produced by polymerizing the monomers in the presence of the preformed rubber. It is believed that a portion of the polymer formed grafts onto the preformed rubber since it is generally not possible to extract the rubber from the polymerized mass with the usual rubber solvents although some of the rubber polymer may not be in actual chemical combination with the polymer.

Since 100% grafting efficiency is not usually attainable, at least a portion of the monomers polymerized in the presence of the preformed rubber will not chemically combine therewith so as to provide a matrix for the graft copolymers. This portion may be increased or decreased depending upon the ratio of monomers to rubber, the particular monomer formulation, the nature of the rubber, and the conditions of polymerization. Generally, interpolymers prepared without the inclusion of rubber will be compounded with material from the graft polymerization reactions to obtain the desired composition.

Any of the usual polymerization processes may be used to effect polymerization of the ungrafted superstrate, i.e., mass, suspension and emulsion, or combinations thereof. Such techniques are well known and are also described herein with respect to the graft copolymerization reactions.

The rubber substrate

The preferred rubbers are diene rubbers or mixtures of diene rubbers, i.e., any rubbery polymers (a polymer having a second order transition temperature not higher than 0° centigrade, preferably not higher than −20° centigrade, as determined by ASTM Test D-746-52T) of one or more conjugated 1,3 dienes, e.g., butadiene, isoprene, piperylene, chloroprene, etc. Such rubbers include homopolymers and interpolymers of conjugated 1,3-dienes with up to an equal amount by weight of one or more copolymerizable monoethylenically unsaturated monomers, such as monovinylidene aromatic hydrocarbons (e.g., styrene; an aralkylstyrene, such as the o-, m-, and p-methylstyrenes, 2,4-dimethylstyrene, the ar-ethylstyrenes, p-tert-butylstyrene, etc.; an alpha-alkylstyrene, such as alpha-methylstyrene, alpha-ethylstyrene, alphamethyl-p-methylstyrene, etc.; vinyl naphthalene, etc.); arhalo monovinylidene aromatic hydrocarbons (e.g., the o-, m-, and p-chlorostyrenes, 2,4-dibromostyrene, 2-methyl-4-chlorostyrene, etc.); acrylonitrile; methacrylonitrile; alkyl acrylates (e.g., methyl acrylate, butyl acrylate, 2-ethylhexyl acrylate, etc.), the corresponding alkyl methacrylates; acrylamides (e.g., acrylamide, methacrylamide, N-butyl acrylamide, etc.); unsaturated ketones (e.g., vinyl methyl ketone, methyl isopropenyl ketone, etc.); alphaolefins (e.g., ethylene, propylene, etc.); pyridines; vinyl esters (e.g., vinyl acetate, vinyl stearate, etc.); vinyl and vinylidene halides (e.g., the vinyl and vinylidene chlorides and bromides, etc.); and the like.

Although the rubber may contain up to about 2% of a crosslinking agent, based on the weight of the rubber-forming monomer or monomers, crosslinking may present problems in dissolving the rubber in the monomers for the graft polymerization reaction, particularly for a mass or suspension polymerization reaction. In addition, excessive crosslinking can result in loss of the rubbery characteristics. The crosslinking agent can be any of the agents conventionally employed for crosslinking diene rubbers, e.g., divinylbenzene, diallyl maleate, diallyl fumarate diallyl adipate, allyl acrylate, allyl methacrylate, diacryates and dimethacrylates of polyhydric alcohols, e.g., ethylene glycol dimethacrylate, etc.

A preferred group of rubbers are those consisting essentially of 75 to 100% by weight of butadiene and/or isoprene and up to 25% by weight of a monomer selected from the group consisting of monovinylidene aromatic hydrocarbons (e.g., styrene) and unsaturated nitriles (e.g., acrylonitrile), or mixtures thereof. Particularly advantageous substrates are butadiene homopolymer or an interpolymer of 90 to 95% by weight butadiene and 5 to 10% by weight of acrylonitrile or styrene.

Various techniques are customarily employed for polymerizing rubber monomers including mass, suspension and emulsion polymerization. Emulsion polymerization can be used to produce a latex emulsion which is useful as the base for emulsion polymerization of the graft copolymer.

Graft polymerization processes

The graft copolymers are prepared by polymerizing monomers of the interpolymer in the presence of the preformed rubber substrate, generally in accordance with conventional graft polymerization techniques involving suspension, emulsion or mass polymerization, or combinations thereof. In such graft polymerization reactions, the preformed rubber substrate generally is dissolved in the monomers and this admixture is polymerized to combine chemically or graft at least a portion of the interpolymer upon the rubber substrate. Depending upon the ratio of monomers to rubber substrate and polymerization conditions, it is possible to produce both the desired degree of grafting of the interpolymer onto the rubber substrate and the polymerization of ungrafted interpolymer to provide a portion of the matrix at the same time.

Although the amount of interpolymer superstrate grafted onto the rubber substrate may vary from as little as 10 parts by weight per 100 parts of substrate to as much as 250 parts per 100 parts, and even higher, the preferred graft copolymers have a superstrate-substrate ratio of about 30–200:100 and most desireably about 70–150:100. With graft ratios above 30:100, a highly desirable degree of improvement in various properties generally is obtained.

To minimize requirements for separate equipment, the same process of polymerization desirably may be utilized to prepare both sizes of rubber graft components, as well as ungrafted interpolymer or crystal for use as the matrix when required. Generally, the particle sizes of the graft copolymer can be varied by varying the size of the rubber substrate employed. For example, a rubber latex which will usually have a relatively small particle size, i.e., less than about 0.2 micron, may be creamed through the use of polyvalent metal salts to obtain agglomeration or coagulation of a number of the small rubber particles into a larger mass. During the grafting reaction, the polymerizing monomers will graft onto this agglomerate and thus provide a graft copolymer of larger size. In addition, seeding techniques during polymerization of the rubber and/or during the polymerization of the graft copolymers may be utilized to vary the size of the particles thus produced.

Chain transfer agents or molecular weight regulators also exhibit an effect upon the size of the graft copolymer produced, particularly in mass and suspension polymerization reactions. The effect of the rate of addition of chain transfer agents will be referred to hereinafter. The viscosity of the polymerizing mixture also tends to affect the condensate particle size of the polymers.

To some extent, crosslinking and the ratio of the superstrate to substrate in the graft copolymer tend to affect the particle size of the graft copolymers by reason of an apparent tendency for the particles to aggregate or agglomerate as the amount of grafting and/or crosslinking becomes minor.

The graft copolymer particles produced in various polymerization processes may be agglomerated through various techniques in the recovery thereof such as during the coagulation and/or dewatering techniques. Heat and other conditions of polymerization such as catalysts monomer ratios, rate of addition of monomers, etc., also tend to affect the particle size of the graft copolymers produced thereby.

However, different polymerization techniques may be utilized to produce the two different sizes of graft copolymer particles by reliance upon inherent process characteristics. In practice, it has been found desirable to utilize an emulsion polymerization process to form the smaller graft particles and a mass-suspension polymerization process to form the larger particles since highly spherical particles are produced within a relatively narrow size range. Generally, the graft copolymerization inherently produces crosslinking, and this may be enhanced by selection of process conditions to ensure discreteness of the graft copolymer particles.

It will be appreciated that both the large and small particle graft copolymer components may be provided by mixtures of two or more separately formed graft copolymers of distinctive properties to vary still further the benefits of the present invention. For example, the small particle graft copolymer may be a cocoagulation of two different graft copolymer latices having different superstrate to substrate ratios, or the large particle graft copolymers may be formed by two different suspension products with varying superstrate to substrate ratios.

Mass-suspension polymerization process

In an advantageous combination mass-suspension polymerization process, the monomers, rubber substrate and catalyst (as well as other optional components) are charged to a suitable reactor and thereafter polymerized en masse by heating at a temperature of about 75° to 125° centigrade over a period of about one to forty-eight hours and at a pressure of 1 to 100 pounds per square inch until a portion of the monomer has been polymerized, generally about 15.0 to 50.0% by weight thereof with conventional stirring to aid heat transfer during reaction. The time for this partial polymerization will vary depending upon the catalyst, pressures and temperatures employed and the particular monomers and ratios thereof. Generally, it is preferred to conduct such a prepolymerization process to convert approximately 20.0 to 35.0% by weight of the monomer.

Any free radical generating catalyst may be used in the practice of this invention including actinic radiation. It is preferable to incorporate a suitable catalyst system for polymerizing the monomer such as the conventional monomer-soluble peroxy and perazo compounds. Exemplary catalyst are di-tert-butyl peroxide, benzoyl peroxide, lauroyl peroxide, oleyl peroxide, toluyl peroxide, di-tert-butyl diperphthalate, tert-butyl peracetate, tert-butyl perbenzoate, dicumyl peroxide, tert-butyl peroxide isopropyl carbonate, 2,5-dimethyl-2,5 di(tert-butylperoxy) hexane, 2,5-dimethyl-2,5-di(tert-butylperoxy) hexyne-3, tert-butyl hydroperoxide, cumene hydroperoxide, p-methane, hydroperoxide, cyclopentane hydroperoxide, diisopropylbenzene hydroperoxide, p-tert-butylcumene hydroperoxide, pinane hydroperoxide, 2,5-dimethylhexane-2,5-dihydroperoxide, etc., and mixtures thereof.

The catalyst is generally included within the range of 0.001 to 1.0% by weight, and preferably on the order of 0.005 to 0.5% by weight of the polymerizable material, depending upon the monomers and the desired polymerization cycle.

As is well known, it is often desirable to incorporate molecular weight regulators such as mercaptans, halides and terpenes in relatively small percentages by weight, on the order of 0.001 to 1.0% by weight of the polymerizable material. In addition, it may be desirable to include relatively small amounts of antioxidants or stabilizers such as the conventional alkylated phenols, although these may be added during or after polymerization.

The syrup provided by the partially polymerized formulation is then admixed with water in the presence of a suspending agent such as the acrylic acid-acrylate interpolymers of U.S. Pat. No. 2,945,013 granted July 12, 1960 and U.S. Pat. No. 3,051,682 granted Aug. 28, 1962. Secondary dispersing aids may also be added to obtain the desired suspension of the syrup in the water. The suspending agent is desirably added to the water although it may be added to the monomers ab initio or during initial polymerization. This suspension is subjected to agitation and heated at a temperature of about 75° to 200° centigrade for a period of one to 48 hours to obtain substantially complete polymerization of the monomers therein. Preferably, such further polymerization is carried out at a temperature of about 100° to 170° centigrade for a period of one to twenty hours depending upon the catalyst and the amount thereof employed. After substantial completion of the polymerization reaction, any unreacted monomers or volatile residue components are stripped and the polymer beads are recovered by centrifuging, washed and dried.

Alternatively, the monomers and rubber substrate may be suspended in water initially and the entire polymerization reaction conducted in suspension. In either process, additional monomers, catalyst and other components may be introduced into the polymerizable formulation at various stages of the polymerization process as so desired.

Emulsion polymerization process

In the emulsion polymerization process, the monomers and rubber substrate are emulsified in water by use of suitable emulsifying agents such as fatty acid soaps, alkali metal or ammonium soaps of high molecular weight alkyl or alkaryl sulfates and sulfonates, mineral acid salts of long chain aliphatic amines, etc. Emulsifying agents which have proven particularly advantageous are sodium oleate, sodium palmitate, sodium stearate and other sodium soaps. Generally, the emulsifying agent is provided in an amount of about 1 to 4 parts per part of monomers, and even in larger ratios where greater dilution is desirable.

If so desired, an aqueous latex formed in the emulsion polymerization of the rubber substrate may provide the aqueous medium into which the monomers are incorporated with or without additional emulsifying agents, etc. However, the rubber may be dissolved in the monomers and the mixture emulsified, or a latex thereof may be separately prepared.

Various water-soluble free radical polymerization initiators are conventionally used for emulsion polymerization of the rubber monomer including conventional peroxy and perazo catalysts and the resultant latex may be used as the aqueous medium with which the interpolymer monomers are admixed. In this manner, the catalyst for the rubber polymerization may function in whole or in part as the catalyst for the graft polymerization. However, additional catalyst may be added at the time of graft polymerization. Exemplary of suitable peroxy catalysts are the alkali metal peroxides, persulfates, perborates, peracetates and percarbonates and hydrogen peroxide. If so desired, the catalysts may be activated to form redox systems. In addition, it may be advantageous to include an oil-soluble catalyst such as those hereinbefore identified for mass-emulsion polymerization processes. However, other free-radical generating catalysts may be employed such as actinic radiation.

Chain transfer agents and other polymerization modifiers may desirably be included and it is generally advantageous to incorporate a higher alkyl mercaptan, such as tert-dodecyl mercaptan, which acts both as a promoter and a regulator. In addition, antioxidants and stabilizers such as the alkylated phenols may be added.

The emulsion mixture is then polymerized in an inert atmosphere at temperatures in the range of 20° to 100° centigrade with agitation. Pressures of 1 to 100 pounds per square inch may be employed and the monomers and/or additional catalyst may be added incrementally or continuously over a portion of the reaction cycle. Polymerization is continued until substantially all, i.e., more than 90% of the monomers have reacted. The remaining monomers and other volatile components are then distilled from the latex, which is then dewatered, washed and dried.

Particle size of the emulsion graft particles may be varied by seeding, emulsifying agent concentration, agitation, rubber-size coagulation techniques, etc. Agglomeration of particles may also be employed.

Rubber Particle Size and Analysis

The rubber particles grafted in emulsion have an average particle size of from about 0.005 to 0.30 microns, preferably 0.05 to 0.25 microns. Larger sizes for grafting can be agglomerated in the rubber latex to sizes of from about 0.1 to 0.5 before grafting and stabilizing at the larger sizes.

Larger rubber particles ranging from about 0.5 to 1.5 microns, preferably 0.8 to 1.2 microns, can be prepared by mass or mass/suspension polymerization processes as disclosed. The mass polymerized grafted rubber particles have grafted superstrate interpolymers and also contain occlusions of the interpolymer contained within the rubber particle differing from the emulsion grafted rubber particle that has only grafted superstrate.

The particle size of the rubber, grafted or ungrafted can be determined as a weight average particle diameter with a photosedimentometer by the published procedure of Graves, M. J. et.al., "Size Analysis of a Centrifugal Photosedimentometer," British Chemical Engineering 9:742–744 (1964). A Model 3000 Particle Size Analyzer from the Martin Sweets Co., Louisville, Ky. was used.

The rubbers can be analyzed for graft and occlusions along with swelling index by the well known gel tests. The first or second grafted rubber copolymers is dispersed in tetrahydrofuran (1g/10 ml) which dissolves the polymer leaving the dispersed rubber as a gel phase. The rubber phase is separated from the dispersion by centrifuge as a gel and dried in a vacuum oven at 50° C. for 12 hours and weighed as a dry gel.

$$\% \text{ Dry Gel in Polyblend} = \frac{\text{Weight of dry gel}}{\text{Weight of polyblend}} \times 100$$

$$\% \text{ Graft and Occlusions in Rubber} = \frac{\% \text{ dry gel} - \% \text{ rubber}}{\text{Percent rubber*}} \times 100$$

*Percent rubber determined by infra-red spectrochemical analysis of the dry gel $$\text{Parts by weight of graft polymer and occluded polymer per unit weight of rubber} = \frac{\% \text{ dry gel} - \% \text{ rubber}}{\text{Percent rubber}}$$

The swelling index of the first grafted rubber can range from 2 to 40 preferably 5 to 20 whereas the swelling index of the second grafted rubber can range from 2–10, preferably 2–5.

The swelling index of the rubber graft particles is determined by taking the dry gel above and dispersing it in tetrahydrofuran for 12 hours. The gel is separated by centrifuge and the supernatant toluene drained free. The wet gel is weighed and then dried in a vacuum oven for 12 hours at 50° C. and weighed.

Swelling Index = weight of wet gel/weight of dry gel

The graft and occlusion interpolymers are present in the rubber particles having a monodisperse particle size distribution of 0.5 to 1.5 in amounts of from about 1 to 4 parts per part of rubber moiety.

The alloys contain said grafted rubber particles as a dispersed rubber phase in amounts of from about 1 to 70% by weight preferably 2 to 35% by weight based on said alloy. The grafted rubber particles may be present in a bimodal particle size distribution wherein about 70 to 97% of the particles have a weight average particle size of from about 0.01 to 0.5 microns and 3 to 30% by weight having a particle dize ranging from about 0.5 to 1.5 microns. Alloys containing one monodisperse rubber particle size of from about 0.5 to 1.5 can also be used for optimum impact strength wherein gloss in molding is not essential. High gloss alloys are formulated with greater proportions of the smaller rubber particle having a bimodal particle size distribution as disclosed.

Process for Alloy Preparation

Components (A), (B), (C) and (D) can be melt colloided in various proportions by first dry blending said components by conventional means such as mixers, ribbon blenders and the like followed by melt blending, e.g. in an extruder, mill rolls or Banbury mixer. Temperatures for melt blending depend on the melt temperature of the alloy components. Generally, the alloys are melt colloided in the stock temperature range of 175° to 250° C. One preferred method is to melt colloid the polymer having the lower melt temperature with the filler prior to melt colloiding with the polymer having a higher melt temperature to insure uniform distribution of the filler.

The proportion of the components of the alloy range in percent by weight of the total alloy with (A) being about 50 to 94%, (B) about 2 to 35%, (C) about 2 to 40% and (D) about 2 to 40%.

It will be readily appreciated that optional components may be added to the composition depending upon the intended use and nature thereof, such as, for example, pigments. Generally, it is necessary to incorporate stabilizers and antioxidants to prevent degradation of the graft copolymer and oftentimes of the interpolymer of the matrix. Although the stabilizers and antioxidants may be incorporated at the time of final blending, generally it is most advantageous to incorporate these components into the graft copolymers after they are formed so as to minimize any tendency for degradation or oxidation during processing and storage.

tance to maintain their solid physical structure at least at the melting temperature of the particular polymers to be used in the alloy.

TABLE 1

|  | TEST[8] | POLYMERS (C) | | | | | |
|---|---|---|---|---|---|---|---|
|  |  | PMMA[1] | AMIDES[2] | PPE[3] | PC[4] | PE[5] | CAB[6] |
| Specific Gravity | D792 | 1.17–1.20 | 1.12–1.4 | 1.06–1.0 | 1.2 | 1.37–1.38 | 1.15–1.22 |
| Tensile Strength | D638 | 7,000–11,000 | 7,000–12,400 | 7,800–9,600 | 8,000–9,500 | 10,400 | 2,600–6,900 |
| Elongation % | D638 | 2–10 | 20–400 | 20–30 | 100–130 | 100–300 | 40–88 |
| Tensile Modulus | D638 | 3.8–4.5 | 4.5 | 3.6–3.8 | 3.0–3.5 | — | 0.5–2.0 |
| Hardness Rockwell | D785 | 85–105 | 103–119 | 115–119 | 73–78 | 120 | 31–116 |
| Thermal Expansion $10^{-5}$/in/in/° C. | D696 | 5–9 | 8.3 | 5.2 | 6.6 | 6–9.5 | 11–17 |
| Impact Strength (Izod) ft.lb./in. | D256 | 0.3–0.5 | 0.8–5.5 | 1.7–1.8[7] | 12–18[7] | 0.8 | 0.8–6.3 |

[1]Polymethylmethacrylate (Solubility Parameter (S.P.) is about 10.
[2]Polyamide Type 6 (Caprolan) (S.P. is about 12.4).
[3]Polyphenylene ether (polydimethylphenylene oxide) (S.P. is about 8.4).
[4]Polycarbonate (S.P. is about 9.5).
[5]Polyesters (S.P. is about 1–12) thermoplastic.
[6]Cellulose acetate butyrate ASTM D707 and available as Tenite (S.P. is about 8 to 9). from Eastman Chemical, Kingsport, Tenn.
[7](⅛ × ½" bars)
[8]ASTM Tests The present process permits the two graft copolymers to be prepared separately and the matrix interpolymer to also be prepared separately with the several components being storable for extended periods of time and blended only as required to form the desired composition. Thus, the rubber level of the balance of properties can be varied by selection of readily variable percentages of the several components.

If so desired, minor amounts of ungrafted rubber may be blended into the present compositions to permit some reduction in the amounts of graft copolymer required by should not exceed about 10% by weight of the combined graft copolymers to avoid undesirable reduction in properties.

Polymers (C)

The polymers (C) other than (A) or (B) are selected from the group consisting of polymethylmethacrylate, polycarbonate, polyphenylene ether, polyester, polyamide, cellulose acetate butyrate and mixtures thereof.

The polymers (C) to be used in the present invention can have, for example, the following physical properties as shown in Table 1. The polymers (C) are all thermoplastic polymers with all polymers (C) except polymethylmethacrylage having heteroatoms in the chain. The heteroatom polymers can be prepared as disclosed in the publication, "Polymer Chemistry" by Bruno Vollmert published by Springer-Verlag, New York (1973) on pages 206–255. The preferred polymers (C) have solubility parameter values ranging from about 8.5 to 13. Polymers (C) having this range of values have been found to have the right order of compatibility with the matrix polymer. Solubility parameters for polymers (C) can be determined by the methods described in the Polymer Handbook, Second Edition, Wiley-Interscience Publication, John Wiley and Sons, New York, N.Y. Values for polymers (C) and the method are shown in Section IV, pages 337–385.

Inorganic Fillers

For purposes of this invention, fillers generally comprise all common inorganic fillers which are available as fine particulate solids and of sufficient thermal resistance to maintain their solid physical structure at least at the melting temperature of the particular polymers to be used in the alloy.

Typical fillers, e.g. include clay, carbon black, various forms of silica, including common sand and glass, metals and oxides of metals such as aluminum oxide, titanium oxide, magnesium oxide (Dolomite), calcium carbonate, barium carbonate, magnesium carbonate, barium sulfate, antimony trioxide, calcium silicate, diatomaceous earth ($CaCO_3$), Fullers earth, mica, talc, slate flour, volcanic ash, glass fibre, asbestos and barium ferrites.

Commercial fillers such as Whitetex which is a calcinated kaolin (clay) comprising about 45% $Al_2O_3$, about 53% $SiO_2$, about 1.4% $TiO_2$ et.al., available from Freeport Kaolin Co., New York, N.Y. is a preferred filler.

Particle sizes of the fillers can range from 100 to 400 U.S. Sieve Series sizes or from about 30 to 150 microns. Smaller particles are preferred in the range of 0.05 to 30 microns for optimum properties such as toughness, modulus and gloss of molded parts.

Poor dispersion of fillers effect physical properties. Filler agglomerates that are not broken up or reagglomerated give mottled surfaces. Several routes to better filler dispersion are possible. Dry blending is essential and the Henschel mixer as described in U.S. Pat. No. 2,945,634 can be used. The mixer is a jacketed mixer for temperature control with a high speed impeller blade having an RPM as high as 1400 to 1700 R.P.M. Henscheling with wetting agents or dispersing agents such as magnesium stearate and ethylene bisstearamide provided polymer particles evenly coated with fillers so that uniform dispersion was obtained when the alloy dry mix was melt colloided by extrusion or intensive Banbury mixing at elevated temperatures. Antioxidants, can also be used in the dry blend to stabilize the grafted rubber during melt colloiding.

The following examples are presented as illustrations only and are not intended to limit the scope and spirit of the invention.

EXAMPLE 1

Part A

To a 250.0 parts of a latex of butadiene/acrylonitrile copolymer (93:7) containing 50.0% solids and approximately 1.0 part of rubber reserve soap as an emulsifier were added 70.0 parts water, 1.0 part rubber reserve soap and 1.0 part potassium persulfate.

alloys which were tested for physical properties as shown in Table 2.

TABLE 2

|  | EXAMPLES | | | |
| --- | --- | --- | --- | --- |
|  | 2 | 3 | 4 | 5 |
| Preblend (SAN/Grafted Rubber) | 100 | 100 | 100 | 100 |
| Fillers |  |  |  |  |
| Whitetex | 0 | 20 | 20 | 20 |
| TiO$_2$ | — | 5 | 5 | 5 |
| Magnesium Stearate* | 0.8 | 1.5 | 1.5 | 1.5 |
| Polymers (C) |  |  |  |  |
| Type | 0 | 0 | Polymethyl Methacrylate | Tenite Cellulose Butyrate |
| Concentration | 0 | 0 | 15 | 15 |
| Properties |  |  |  |  |
| Tensile |  |  |  |  |
| Yield psi (ASTM-D638-68) | 5600 | 4640 | 4500 | 4550 |
| Fail psi (ASTM-D638-68) | 4950 | 4030 | 3950 | 3850 |
| % Elongation at Fail (D638-68) | 13 | 10 | 12 | 13 |
| Modulus × 10$^{-5}$ psi (ASTM D638-68) | 3.1 | 3.25 | 3.3 | 3.3 |
| Spiral Flow, cm** | 41 | 34 | 46 | 48 |
| Molded Surface (Visual Appearance) | Glossy | Poor Mottled | Glossy | Excellent Glossy |

*Magnesium stearate blended with filler before adding to alloy blend
**Modern Plastics Encyclopedia, Guide to Plastics, 1970

This emulsion was heated to 65° centigrade with stirring and then there were added thereto over a period of about six hours 140.0 parts styrene, 60.0 parts acrylonitrile and 3.0 parts of terpinolene. The emulsion was held at temperature for one hour thereafter with stirring, cooled, coagulated by the addition of magnesium sulfate and the coagulant was then washed and dried. The resulting graft copolymer has a superstrate to substrate ratio of about 0.9:1.0 and a particle size (number average) of about 0.14 micron.

Part B

Fourteen parts of a soluble butadiene rubber were dissolved in 26.0 parts of acrylonitrile and 60.0 parts styrene. There were added thereto 0.07 part of a mixture of tertbutyl peracetate, 0.05 part di-tert-butyl peroxide and stabilizers. The mixture was heated to 100° centigrade with stirring. Terpinolene was added as a chain transfer agent over a period of approximately five hours in an amount of about 0.1 part per hour for approximately five hours, at the end of which time an additional 0.4 part was added.

At 30.0% conversion of the monomers, the partially polymerized syrup was dispersed in 120.0 parts water to which was added 2.0 parts styrene and, as a suspending agent, 0.3 part of an interpolymer of 95.5 mol percent of acrylic acid and 4.5 mol percent of 2-ethylhexyl acrylate which has a specific viscosity of about 4.0 as determined in a 1.0% solution in water at 25° centigrade. The resulting suspension was stirred and heated to polymerize the remaining monomer, cooled, centrifuged, washed and dried to recover the graft copolymer in the form of small spherical beads. The ratio of superstrate to substrate was about 1.1:1.0 and the particle size was about 1.15 micron.

EXAMPLES 2 - 5

To a dry blender was added 40 parts of polymer A, 43.0 parts of polymer B and 37 parts of an styrene/acrylonitrile (S/AN) polymer providing a blend of about 15% by weight of rubber about 15% by weight grafted S/AN polymer and about 70% S/AN matrix polymer. About 100 parts of this preblend was blended with various proportions of fillers and polymer C as parts by weight and melt colloided at 250° C. in an extruder into It is evident from the data that the physical properties of the alloys in in Examples 4–5 such as elongation at fail, modulus and spiral flow or melt flow were unexpectedly high for such a highly filled polymeric alloy. It is to be noted that the mold ability was much improved for the alloys shown in Examples 4 and 5 whereas the filled SAN-grafted rubber blend of Example 3 had poor flow and moldability.

What is claimed is:

1. A fusible polymeric alloy composition comprising a blend of:
   A. a matirx interpolymer comprising polymerized monovinylidene aromatic and ethylenically unsaturated nitrile monomers,
   B. a grafted rubber copolymer having a diene rubber as a substrate grafted with said monomers as superstrate interpolymers,
   C. a polymer other than (A) or (B) having a solubility parameter in the range of 8.5 to 13, said polymer (C) being selected from the group consisting of polymethylmethacrylate, polycarbonate, polyphenylene ether, cellulose butyrate, polyester, polyamide and mixtures thereof, and
   D. an inorganic filler.

2. A composition of claim 1 wherein (A) is present in amounts of from about 50 to 94%, (B) 2 to 35%, (C) 2 to 40% and (D) 2 to 25% by weight based on said composition.

3. A composition of claim 1 wherein said diene rubber is polybutadiene, copolymers of butadiene with styrene, acrylonitrile or mixtures thereof.

4. A composition of claim 1 wherein said graft copolymer comprises a first graft copolymer having a rubber particle size of from about 0.5 to 1.5 microns and a second graft copolymer having a rubber particle size of from about 0.01 to 0.5 microns.

5. A composition of claim 1 wherein said graft copolymer has a rubber particle size of from about 0.5 to 1.5 microns having present grafted and occluded copolymer of said monomer in amounts of from about 1 to 4 parts per part of rubber.

6. A composition of claim 1 wherein said matrix interpolymer has said monovinylidene aromatic monomer present in amounts of from about 55 to 85% by weight of said interpolymer and said ethylenically unsaturated nitrile monomer present in amounts of from about 15 to 45% by weight of said interpolymer and wherein said grafted diene rubber copolymer has grafted interpolymers of substantially the same compositions as said matrix interpolymers.

7. A composition of claim 1 wherein said filler is selected from the group consisting of clay, carbon black, silica, metals, metal oxides, metal carbonate, metal sulfate, calcium silicate, diatomaceous earth, Fuller earth, mica, talc, slate flour, volcanic ash, dolomite, barium ferrite and mixtures thereof.

8. A composition of claim 1 wherein said monovinylidene aromatic monomer is styrene and said ethylenically unsaturated nitrile monomer is acrylonitrile.

9. A composition of claim 1 wherein said grafted diene rubber has a graft superstrate to rubber substrate ratio of about 50:100 to 200:100.

10. A composition of claim 1 wherein said diene rubber contains at least about 75% by weight of a conjugated diene 1,3 rubber forming monomer.

* * * * *